ELECTRONIC DIGITAL CALCULATING EQUIPMENT

Filed Nov. 5, 1956

INVENTOR
RAYMOND BIRD
BY Frederick L. E. Haug
ATTORNEY

3,001,707
ELECTRONIC DIGITAL CALCULATING EQUIPMENT

Raymond Bird, Letchworth, England, assignor to International Computers and Tabulators Limited, a British company Filed Nov. 5, 1956, Ser. No. 623,516
Claims priority, application Great Britain Nov. 11, 1955
22 Claims. (Cl. 235—155)

Figure 1:
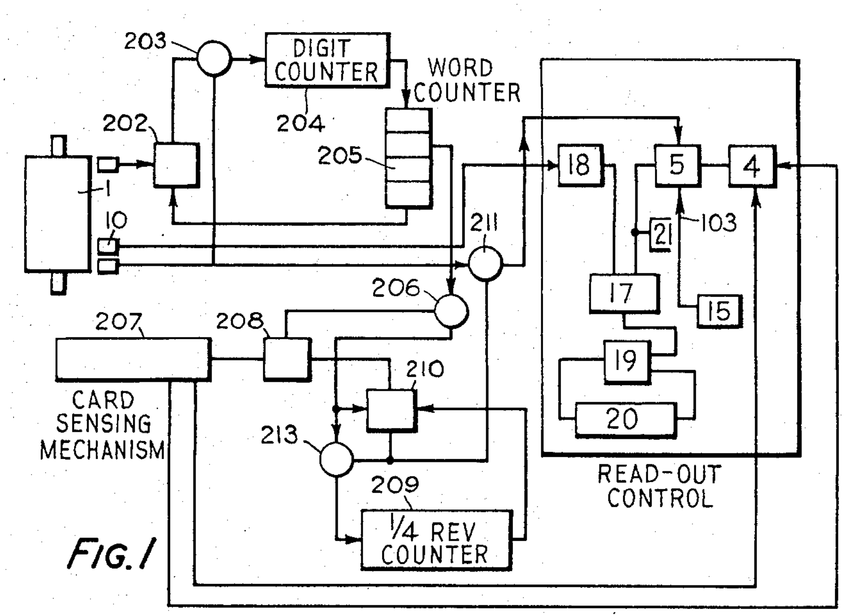

The present invention relates to calculating apparatus in which conversion of information from one notation to another, e.g., from decimal to binary, is required and is particularly concerned with circuits for effecting such conversion.

An arrangement for converting data in decimal notation in the form of holes punched in record cards to binary electrical signals for use in calculating apparatus is described in detail in British Patent No. 777,244 and French Patent 1,096,931.

In summary arrangement there is provided in this prior arrangement a magnetic drum storage device having selected binary equivalents permanently recorded in succession on a track of the drum. The equivalents are selectively read out under the joint control of a diode matrix, functioning as a sequencing device, and a card sensing mechanism to effect conversion of decimal digits sensed from a card.

The sensing mechanism exerts its control by means of registration or storage devices which are set as each hole representing a digit of a digital group is sensed and remain set until the end of a sensing cycle. A set of equivalents is read off the drum at each index point position sensed so that the time in a sensing cycle at which a particular registration device is set determines how many times the corresponding equivalent is read out during a sensing cycle. The equivalents are fed to an accumulator which sums the repeated read-outs to give the true binary equivalent.

The diode matrix conditions each of a set of read-out control gates in turn at the instants when the equivalent corresponding to each gate is being read out, so that if the storage device associated with a particular gate is set at the time the gate is conditioned by the matrix, the appropriate equivalent is read out.

As, in the prior arrangement, the sensing mechanism does not necessarily operate in timed relation to the rotation of the magnetic drum it is necessary, in order to ensure that a full set of equivalents is available for selection, to complete at least two revolutions of the drum as each index point position is sensed. This however, introduces the possibility of an equivalent being read out more than once at one index point position, which is undesirable, and to overcome this difficulty the operation of the matrix as a sequencing device is controlled so as to begin at the beginning of a complete set of equivalents, as denoted by an end-of-revolution signal derived from the drum, and to be terminated as soon as the complete set of equivalents has been made available for selection. This is denoted by the output signal from a counter arranged to count end-of-equivalent signals from the drum, the individual stages of which counter control the sequencing operation of the matrix.

Thus in non-synchronous operation of the drum and the card sensing mechanism the maximum effective speed of conversion entails two drum revolutions per index point position sensed and it is the object of the present invention to provide an improved control circuit which will entail only slightly more than one drum revolution per index point position sensed.

According to the invention data conversion apparatus including a cylindrically operable source of conversion equivalents is provided with a source of signals corresponding in time to predetermined fractions of a cycle of operation of said source of equivalents, means for counting such fraction signals and for producing an output signal upon registering a predetermined count, means for gating the application of said fraction signals to said counting means, and control means adapted to be rendered operative in response to a fraction signal passed by said gating means and to be rendered inoperative by said output signal, and effective to control read-out of a full cycle of equivalents from said source of equivalents.

Figure 2:
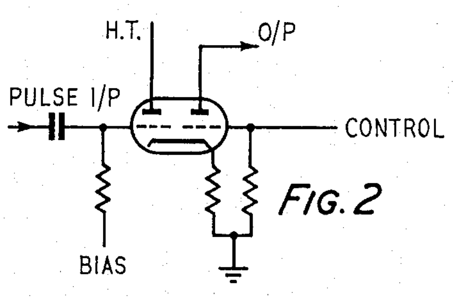
Figure 3:
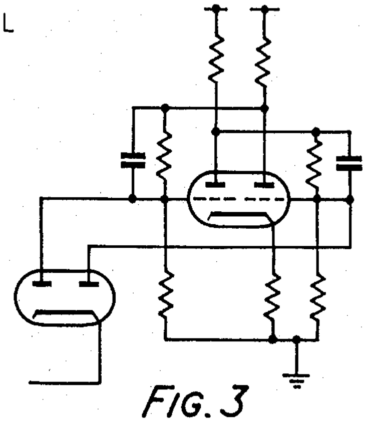
Figure 4:
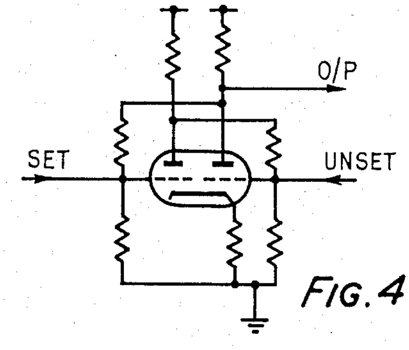

The invention will be understood from the following description taken in conjunction with the accompanying drawings of which:

FIGURE 1 is a schematic diagram of the control circuitry of a data conversion apparatus and FIGURES 2 to 4 show details of the principal circuit elements shown schematically in FIGURE 1.

The schematic diagram of FIGURE 1 shows in detail only those parts of a complete data conversion apparatus necessary to explain the present invention, the remaining parts being assumed to be substantially as described in British Patent 777,244 and being indicated only generally and so far as is necessary to show their connections to the control circuits provided by this invention.

As in the previously described system, there is provided a magnetic storage drum 1. Signals from two pre-recorded tracks of the drum 1 are utilized to operate the control circuits shown, these signals being respectively end-of-revolution signals which are applied to set a trigger 202 and clock pulses which are applied to two gates 203 and 211. When a trigger 202 is set by an end-of-revolution signal it opens gate 203 to admit clock pulses to a counter 204 which is arranged to count the number of clock pulses corresponding to the number of digits in a conversion equivalent, e.g., thirty-two, and to deliver an end-of-equivalent pulse to a further counter 205.

Counter 205 is a binary counter arranged to count a full set of equivalents and to produce an output pulse which is applied to unset trigger 202. In the present case a full set of equivalents is assumed to be sixteen so that counter 205 has four stages and a further output is taken from the second stage. This output occurs at each quarter of a full set of equivalents and hence at each quarter of a revolution of the drum, but it will be appreciated that the output could be taken from another stage of the counter to indicate a different fraction of a revolution of the drum.

This signal, which will be referred to as a fraction signal, is applied to a gate 206 which is controlled by a trigger 208, itself controlled from the card sensing mechanism and associated circuitry indicated generally at 207 and described in greater detail in the aforesaid British patent. It will be understood that the block 207 includes the elements 2, 3, 7, 25, 26 and CB3 of FIGURE 1 of said British patent. As part of its normal operation this card sensing mechanism produces in well-known manner an index point pulse at each index point position sensed and these pulses are applied to set the trigger 208 and open gate 206. Thus the first fraction signal to occur after an index point pulse has brought about the opening of gate 206 passes through this gate and is applied to a gate 213 and a trigger 210. Gate 213 is controlled by trigger 210 so that until trigger 210 has been set by a fraction signal through gate 206, gate 213 is closed and cannot pass this first fraction signal. Subsequent fraction signals passing through gate 206 also pass through gate 213 and are applied to a counter 209.

Since in the present case the fraction signals indicate quarters of a revolution the counter 209 is arranged to give an output signal upon counting four and this output signal is applied to unset trigger 210, the unset output of which is applied to unset trigger 208. In addition to controlling gate 213 the set output of trigger 210 also controls a gate 211 to which clock pulses from drum 1 are applied so that clock pulses are allowed to pass through gate 211 for as long as trigger 210 remains set, i.e., for one revolution of the drum 1.

These clock pulses are passed to the equivalent read-out control circuitry denoted generally by the block 212 which represents those parts of the earlier apparatus, as shown in FIGURE 1 of British Patent No. 777,244, which are not superseded by the control apparatus described above. Some of the constituent parts of block 212 are shown in FIGURE 1 and given the same references as in FIGURE 1 of said British patent. Thus, there is shown a reading control gate 5 which is controlled by the clock pulses from gate 211, in addition to the potentials from a trigger circuit 4 and matrix 15, the latter applied over line 103, which were used in the earlier apparatus. Trigger circuit 11 of the earlier apparatus is omitted together with trigger circuit 6, gate 8 and the associated connections and no longer contributes to the control of the gate 5. The trigger circuit 4 is here shown with two connections to the card sensing mechanism 207 which incorporates the elements 2–4, 7, 25 and 26 of FIGURE 1 of said British patent.

Block 212 is also shown to include an amplifier 18 which is fed with equivalent signals from an equivalent track on the drum 1 sensed by a drum sensing head 10, connections 21 from the gates 5 of other denominations and a reading gate 17 the output of which is fed to the accumulators 19, 20, all as described in said British patent. Block 212 also includes, although they are not shown, amplifiers 23 and 24 and their associated reading heads, counter 13 and matrix 15 connected to operate as described in said British patent I, the lead 103 connecting the gate 5 to the matrix 15 being shown in FIGURE 1 however.

Using the control apparatus of the present invention connected in the data conversion apparatus of said British patent in the manner set out, it will be seen that the maximum delay between the generation of an index point pulse and the time at which a full set of equivalents have been rendered available is one and one-quarter revolutions of the drum in contrast to the two revolutions required in the prior arrangement referred to. This saving of time can readily be increased by using a smaller fraction of a revolution than a quarter up to the point where the end-of-equivalent pulses themselves are utilized to set trigger 210 and drive a counter such as 209.

It will be appreciated that the fraction signals could be derived directly from the drum 1 if appropriate pre-recorded tracks are made available instead of from the counters 204 and 205. Since, however, these counters are frequently provided for other control purposes in apparatus of the kind to which the invention relates it is convenient to utilize them as a source of the fraction signals.

The schematic diagram of FIGURE 1 employs four gates 203, 206 and 211 and 213, three counters 204, 205 and 209 and three triggers 202, 208 and 210 in addition to the conventional element such as the drum 1 and the card sensing mechanism 207, and to the equivalent read-out arrangements of which a detailed description can be had by referring to the prior application mentioned earlier. Details of the gates, counters and triggers are shown in FIGURES 2 to 4.

The gate circuit of FIGURE 2 comprises a double triode to the left-hand grid of which negative-going input pulses are applied and to the right-hand grid of which a control potential such as the set output level of a trigger circuit is applied. The triode sections have a common cathode load and a standing bias is applied to the left-hand grid such as to maintain this grid above the potential of the right-hand grid so that the left-hand triode section conducts and the right-hand section is just cut off when gate opening potential is applied to the right-hand grid. The application of a negative pulse to the left-hand grid causes the common cathode potential to fall below the level of potential on the right-hand grid and thus causes the right-hand section to conduct and generate a negative-going pulse in its anode circuit. Without the gate opening potential on the right-hand grid, however, the cathode potential does not go below the potential of the right-hand grid and the right-hand section thus remains cut off.

The counter stage of FIGURE 3, a number of which are coupled together to form each of the various counters, comprises a cross-coupled double triode including external capacitance in the cross-couplings. Each such stage receives a negative going pulse input from the anode of a triode section of a preceding stage in all stages except the first which receives such pulses from the counter input.

The negative pulses are applied to the common cathode circuit of a double diode coupling valve the anodes of which are connected to the respective grids of the triode sections. The effect of the negative pulse is to render non-conducting whichever section was previously conducting and thus render the other section conducting in well-known manner.

The trigger circuit of FIGURE 4 is similar to the counter stage of FIGURE 3 without the coupling diode and without the external capacitance in the cross-coupling between the triode sections. The trigger is set by a negative pulse applied to the left-hand anode, that is to say, the left-hand triode section is normally conducting in the unset state of the trigger, and is unset by a negative pulse applied to the right-hand grid, the trigger outputs being derived from the anode circuits.

What I claim is:

1. In data conversion apparatus having a source of cyclically generated signals, each cycle of signals representing a predetermined total number of conversion equivalents appearing successively, equivalent-forming means, control means for controlling read-out of said equivalent signals to said equivalent-forming means, and means for generating an initiating signal for initiating read-out at any point in said cycle; the combination comprising a source of fraction signals corresponding in time to predetermined fractions of said cycle, each fraction containing a whole number including one of said equivalents and said predetermined total number comprising an integral number of said fractions, means for counting said fraction signals and for producing an output signal upon registering a count equivalent to said predetermined total, means operated by said initiation signal for gating said fraction signals to said counting means, and means controlled by said fraction signals and said output signal for rendering said control means operative by the first said fraction signal appearing after an initiation signal and for rendering said control means inoperative by said output signal, whereby read-out of a whole cycle of said conversion equivalents is initiated by the first fraction signal appearing after the initiation signal.

2. Apparatus as claimed in claim 1 in which said source of fraction signals comprises a pulse source adapted to produce pulses timed in occurrence in relation to said cycle of operation, and means for counting said pulses and for producing a fraction signal upon registering a count corresponding to a predetermined fraction of a cycle of operation of said source of equivalents.

3. Apparatus as claimed in claim 2 in which said source of equivalents consists of a magnetic storage drum on which signals representing said equivalents are pre-recorded.

4. Apparatus as claimed in claim 3 in which signals representing said timed pulses are also pre-recorded on said storage drum which thus serves as said pulse source.

5. Apparatus as claimed in claim 1 for converting data as it is sensed index point by index point from a punched card, in which said initiation pulse generating means generates a pulse as each index point is sensed.

6. Apparatus as claimed in claim 5 including trigger means adapted to be set by said index point pulses and to be unset by the output pulse of said fraction signal counting means and operative to control operation of said gating means.

7. In data conversion apparatus having a source of cyclically generated signals, each cycle of signals representing a predetermined total number of conversion equivalents appearing successively, equivalent-forming means, control means for controlling read-out of said equivalent signals to said equivalent-forming means, and means for generating an initiating signal for initiating read-out at any point in said cycle; the combination comprising a source of fraction signals corresponding in time to predetermined fractions of said cycle, each fraction containing a whole number including one of said equivalents and said predetermined total number comprising an integral number of said fractions, means for counting said fraction signals and for producing an output signal upon registering a count equivalent to said predetermined total, gating means for gating the application of said fraction signals to said counting means, means controlled by said initiating signal, said fraction signals and said output signal for rendering said gating means operative on the generation of the first fraction signal appearing after said initiation signal and inoperative on the generation of said output signal, and means controlled by said gating means for rendering said read-out means operative with said gating means, whereby read-out of a whole cycle of said conversion equivalents is initiated by the first fraction signal appearing after the initiation signal.

8. In data conversion apparatus having a magnetic drum having recorded on a single track thereof signals representing a predetermined total number of conversion equivalents which appearing successively in a cycle once per revolution of said drum, equivalent-forming means, control means for controlling read-out of said equivalent signals to said equivalent-forming means, and means for generating an initiating signal for initiating at any point in the revolution of said drum read-out to said equivalent-forming means; the combination comprising a source of fraction signals corresponding in time to predetermined fractions of said cycle, each fraction containing a whole number including one of said equivalents and said predetermined total number comprising an integral number of said fractions, means for counting said fraction signals and for producing an output signal upon registering a count equivalent to said predetermined total, means operated by said initiation signal for gating said fraction signals to said counting means, and means controlled by said fraction signals and said output signal for rendering said control means operative by the first said fraction signal appearing after an initiation signal and for rendering said control means inoperative by said output signal, whereby read-out of a whole cycle of said conversion equivalents is initiated by the first fraction signal appearing after the initiation signal.

9. A data storage system comprising a cyclically operating data store having a data storage channel on which a plurality of data words each of which consists of data word elements occurring at selected ones of an equal plurality of discrete element positions, can be stored in serial order, output means associated with the data storage channel for reading out signals representing said data words cyclically in said serial order, a utilization device, a signal channel coupling the output means and the utilization device, a source of initiating signals and control means for controlling the passage of read-out signals through said channel and arranged to operate to select one complete cycle of the read-out signals subsequent to application of a signal from said initiating signal source, said control means comprising means for generating a train of fraction pulses occurring coincidentally with the ends of every $n^{th}$ one of the words read-out by said output means, $n$ being any integral factor of the number of words stored on said data storage channel, a pulse counter arranged to count up to the number equal to the number of fraction pulses corresponding to one cycle of operation of the store and then automatically to reset to zero, first and second gating means in series coupling the fraction pulse generating means and the pulse counter, both gating means being normally closed, means for applying initiating signals from said source to open the first gating means, a switching circuit having first and second states and responsive to the first pulse passed by the first gating means after opening to switch from its first to its second state, means controlling the second gating circuit to open when the switching circuit is in its second state, means responsive to resetting of the pulse counter to reset the switching circuit to its first state, means for closing the first gating circuit on resetting of the switching circuit, and a read-out control circuit in said signal channel and responsive to the condition of the switching circuit to pass signals through the signal channel only when the switching circuit is in its second state.

10. A data storage system comprising a cyclically operating data store having a data storage channel on which a plurality of data words each of which consists of data word elements occurring at selected ones of an equal plurality of discrete element positions, can be stored in serial order, output means associated with the data storage channel for reading out signals representing said data words cyclically in said serial order, a utilization device, a signal channel coupling the output means and the utilization device, a source of initiating signals, and control means for controlling the passage of read-out signals through said channel and arranged to operate to select one complete cycle of the read-out signals subsequent to application of a signal from said initiating signal source, said control means comprising means for generating a train of end of word pulses occurring coincidentally with the ends of the words read-out by said output means, means for generating a train of fraction pulses one for every $n^{th}$ one of the end of word pulses, where $n$ is an integral factor of the number of words on said store channel, a pulse counter arranged to count up to the number equal to the number of fraction pulses corresponding to one cycle of operation of the store and then automatically to reset to zero, first and second gating means in series coupling the fraction pulse generating means and the pulse counter, both gating means being normally closed, means for applying initiating signals from said source to open the first gating means, a switching circuit having first and second states and responsive to the first pulse passed by the first gating means after opening to switch from its first to its second state, means controlling the second gating circuit to open when the switching circuit is in its second state, means responsive to resetting of the pulse counter to reset the switching circuit to its first state, means for closing the first gating circuit on resetting on the switching circuit, and a read-out control circuit in said signal channel and responsive to the condition of the switching circuit to pass signals through the signal channel only when the switching circuit is in its second state.

11. A data storage system according to claim 10 in which said means for applying initiating signals to open the first gating means includes a second switching circuit having first and second states, means for applying said initiating signals to the second switching circuit to switch it from its first to its second state and means for controlling the first gating circuit to open when the second switching circuit is in its second state, and said first gating circuit closing means includes means for resetting said second switching circuit to its first state on resetting of the first mentioned switching circuit.

12. A data storage system according to claim 10 in which said end-of-word pulse generating means includes a clock channel in said store carrying a data element at positions corresponding to every possible element position in said data storage channel, output means associated with the clock channel for deriving a train of clock pulses, a clock pulse counter coupled to said output means and arranged to count up to the number equal to the number of possible element positions in a data word and then automatically to reset to zero, and means for deriving an end-of-word pulse from said counter on each occasion of resetting.

13. A data storage system according to claim 12 in which said end-of-word pulse generating means further includes a second clock channel in said store carrying a data element at a position corresponding to the gap between two data words in the data storage channel, output means associated with the second clock channel for deriving a train of end of cycle pulses, one for each cycle of operation to the store, gating means coupled between the first clock channel output means and the clock pulse counter, control means responsive to an end of cycle pulse for opening said gating means and means responsive to the last clock pulse prior to the succeeding end-of-cycle pulse, for resetting said control means to close said gating means.

14. A data storage system according to claim 10 in which said fraction pulse generating means includes a further pulse counter, means for applying pulses from the end of word pulse generating means to said further pulse counter and means for deriving an output fraction pulse from said further pulse counter on each occasion that it counts $n$ pulses.

15. A data storage system comprising a data store in the form of a rotating magnetizable surface having a data storage track thereon on which a plurality of data words can be stored in serial order, each word comprising data word elements recorded at selected ones of an equal plurality of discrete element positions along said track, output means associated with the data storage track for reading out signals representing said data words cyclically in said serial order, a utilization device, a signal channel coupling the output means and the utilization device, a source of initiating signals and control means for controlling the passage of read-out signals through said channel and arranged to operate to select one complete cycle of the read-out signals subsequent to application of a signal from said initiating signal source, said control means comprising means for generating a train of fraction pulses occurring coincidentally with the ends of every $n^{th}$ one of the words read out by said output means, $n$ being any integral fractor of the number of words stored on said data storage channel, a pulse counter arranged to count up to the number equal to the number of fraction pulses corresponding to one complete rotation of said surface and then automatically to reset to zero, first and second gating means in series coupling the fraction pulse generating means and the pulse counter, both gating means being normally closed, means for applying initiating signals from said source to open the first gating means, a switching circuit having first and second states and responsive to the first pulse passed by the first gating means after opening to switch from its first to its second state, means controlling the second gating circuit to open when the switching circuit is in its second state, means responsive to resetting of the pulse counter to reset the switching circuit to its first state, means for closing the first gating circuit on resetting of the switching circuit, and a read-out control circuit in said signal channel and responsive to the condition of the switching circuit to pass signals through the signal channel only when the switching circuit is in its second state.

16. A data storage system comprising a data store in the form of a rotating magnetizable surface having a data storage track thereon on which a plurality of data words can be stored in serial order, each word comprising data word elements recorded at selected ones of an equal plurality of discrete element positions along said track, output means associated with the data storage track for reading out signals representing said data words cyclically in said serial order, a utilization device, a signal channel coupling the output means and the utilization device, a source of initiating signals and control means for controlling the passage of read-out signals through said channel and arranged to operate to select one complete cycle of the read-out signals subsequent to application of a signal from said initiating signal source, said control means comprising means for generating a train of end of word pulses occurring coincidentally with the ends of the words read out by said output means, means for generating a train of fraction pulses one for every $n^{th}$ one of the end of word pulses, where $n$ is an integral factor of the number of words on said store track, a pulse counter arranged to count up to the number equal to the number of fraction pulses corresponding to one complete rotation of said surface and then automatically to reset to zero, first and second gating means in series coupling the fraction pulse generating means and the pulse counter, both gating means being normally closed, means for applying initiating signals from said source to open the first gating means, a switching circuit having first and second states and responsive to the first pulse passed by the first gating means after opening to switch from its first to its second state, means controlling the second gating circuit to open when the switching circuit is in its second state, means responsive to resetting of the pulse counter to reset the switching circuit to its first state, means for closing the first gating circuit on resetting of the switching circuit, and a read-out control circuit in said signal channel and responsive to the condition of the switching circuit to pass signals through the signal channel only when the switching circuit is in its second state.

17. A data storage system according to claim 16 in which said means for applying initiating signals to open the first gating means includes a second switching circuit having first and second states, means for applying said initiating signals to the second switching circuit to switch it from its first to its second state and means for controlling the first gating circuit to open when the second switching circuit is in its second state, and said first gating circuit closing means includes means for resetting said second switching circuit to its first state on resetting of the first mentioned switching circuit.

18. A data storage system according to claim 16 in which said end-of-word pulse generating means includes a clock track on said surface having a data element at positions corresponding to every element position on said data storage track, output means associated with the clock track for deriving a train of clock pulses, a clock pulse counter coupled to said output means and arranged to count up to the number equal to the number of possible element positions in a data word and then automatically to reset to zero, and means for deriving an end-of-word pulse from said counter on each occasion of resetting.

19. A data storage system according to claim 18 in which said end-of-word pulse generating means further includes a second clock track on said surface carrying a data element at a position corresponding to the gap between two words on the data storage track, output means associated with the second clock track for deriving a train of end of cycle pulses one for each rotation of the surface, gating means coupled between the first clock track output means and the clock pulse counter, control means responsive to an end of cycle pulse for opening said gating means and means responsive to the last clock pulse prior to the succeeding end-of-cycle pulse, for resetting said control means to close said gating means.

20. A data storage system according to claim 16 in which said fraction pulse generating means includes a further pulse counter, means for applying pulses from the end-of-word pulse generating means to said further pulse counter and means for deriving an output fraction pulse from said further pulse counter on each occasion that it counts $n$ pulses.

21. A data storage system according to claim 16 in which the data store is in the form of a rotatable cylindrical drum, the cylindrical surface of which is said magnetizable surface.

22. Data translating apparatus for translating a number in a first notation to a number in a second notation and comprising a cyclically operating data store having a data storage channel on which there is stored in a serial order the translation equivalents in the second notation of the unit values of the different denominations of a number in the first notation, said equivalents each being stored as data elements occurring at selected ones of a plurality of discrete element positions, output means associated with said data storage channel for reading out signals representing said equivalents cyclically in said serial order, an accumulator, a signal channel coupling the output means and the accumulator, gating means in said signal channel and control means for controlling the opening of said signal channel gating means to permit the passage of selected ones of said equivalent representing signals to the accumulator in dependence upon the value of a number in the first notation, the control means comprising a source of signal representing the digits of a number in the first notation, a separate digit entry means for each denomination of a number in the first notation, all coupled to said signal source and each responsive to the signals to take up a set condition for a number of unit periods determined by the value of the digit in the corresponding denomination, means for deriving a first control signal from each said digit entry means when set, a digit control device for each denomination, means for applying the first control signal from each digit entry means to the corresponding digit control device, sequencing means operative in synchronism with the reading out of the equivalent representing signals to apply a second control signal to the digit control devices in serial order for the duration of the equivalent representing signals of the same denomination as the digit control device, means for generating a train of fraction pulses occurring coincidentally with the ends of every $n^{th}$ one of the equivalent representing signals read out by said output means, $n$ being an integral factor of the total number of equivalents, a pulse counter arranged to count up to the number equal to the number of fraction pulses corresponding to one cycle of operation of the store and then automatically to reset to zero, first and second gating means in series coupling the fraction pulse generating means and the pulse counter, both gating means being normally closed, a source of unit period start signals, means for applying said unit period start signals from said source to open the first gating means, a switching circuit having first and second states and responsive to the first pulse passed by the first gating means after opening to switch from its first to its second state, means controlling the second gating circuit to open when the switching circuit is in its second state, means responsive to resetting of the pulse counter to reset the switching circuit to its first state, means for closing the first gating circuit on resetting of the switching circuit, means for deriving a third control signal from said switching circuit when in its second state, means for applying said third control potential to all the digit control devices, means for deriving a read-out control signal from any digit control device which has first, second and third control signals applied to it simultaneously and means for applying said read-out control signals to the signal channel gating means to open it.

References Cited in the file of this patent

UNITED STATES PATENTS

| | | |
|---|---|---|
| 2,540,654 | Cohen | Feb. 6, 1951 |
| 2,594,731 | Connolly | Apr. 29, 1952 |
| 2,680,239 | Daniels et al. | June 1, 1954 |
| 2,817,072 | Kun Li Chien et al. | Dec. 17, 1957 |
| 2,817,480 | Baldwin | Dec. 24, 1957 |

FOREIGN PATENTS

| | | |
|---|---|---|
| 1,096,931 | France | Feb. 9, 1955 |

(Corresponding to British Patent 777,244, June 19, 1957)